Sept. 20, 1971   J. L. SCHURZ   3,606,052
LOADER ATTACHMENT QUICK COUPLER DEVICE
Filed July 3, 1969   3 Sheets-Sheet 2

INVENTOR.
James L. Schurz
BY  Hill, Sherman, Meroni, Gross & Simpson
ATTORNEYS

INVENTOR.
James L. Schurz

United States Patent Office 3,606,052
Patented Sept. 20, 1971

3,606,052
LOADER ATTACHMENT QUICK COUPLER DEVICE
James L. Schurz, Sioux Falls, S. Dak., assignor to Du-Al Manufacturing Company, Sioux Falls, S. Dak.
Filed July 3, 1969, Ser. No. 838,841
Int. Cl. E02f 3/70
U.S. Cl. 214—145   1 Claim

ABSTRACT OF THE DISCLOSURE

A quick-connect-disconnect coupler for attaching loading implements to the forward end of a lifting and dumping type boom assembly. Coupling is accomplished by manipulation of the hydraulic rams of the loader and includes automatic latching of the implement and boom assembly. The latch mechanism may be locked by insertion of a locking pin. Upon release of the latching mechanism, the implement may be uncoupled by reverse operation of the hydraulic rams.

BACKGROUND OF THE INVENTION

Field of the invention

This invention relates to tractor-mounted loading devices, and more particularly to coupling devices which permit the utilization of a variety of loading implements with a single boom assembly.

Description of the prior art

Heretofore, it was generally known to provide a unitary boom and implement assembly for quick attachment to a cooperating frame permanently mounted to a tractor. Such devices are self-supporting in the unmounted, free-standing position and are attached to a tractor upon movement of the tractor into the frame of the boom assembly. With such arrangements, however, the loading implement remains a part of the boom assembly requiring a separate boom assembly with attached implement for each type of loading job demanded of the tractor loader.

In recognition of the disadvantage of providing an implement-boom assembly as a single structure as being an inefficient use of the boom assembly, attachment of a variety of implements to a single boom was then provided by means of bolts, pins and screws or the like. However, this did not completely overcome the inefficiency mentioned above in that the implement and the boom were required to be positioned to prevent binding of these elements with the fastening means and required considerable time and inconvenience for both attaching and detaching the implement to the boom.

SUMMARY OF THE INVENTION

Recognizing the advantages of the provision of a plurality of implements for use with a single boom, and the aforementioned disadvantages attendant to such provisions, it is desirable to provide, and a primary object of the present invention to provide, a coupling device for quick-connect-disconnect of a variety of implements to a single boom of a tractor loader.

It is a further object of the present invention to provide quick-connect-disconnect operations for a variety of implements and a single boom wherein the work of coupling and uncoupling is done primarily by machine operation of the boom thereby reducing manual operations to a very minimum.

According to the invention, each of any desired number of implements are provided with a first type of coupler for cooperable engagement with a second coupler mounted on the end of tractor-mounted boom assembly. The second coupler pivotally connected to the boom and pivotally connected to hydraulic rams which control shoveling and dumping operations and is adapted to cooperably engage the implement mounted coupler upon extension of the rams by the operator of the tractor. The coupling device is provided with an automatic latching mechanism which requires release before the implement is detached by a reverse operation of the boom and rams.

BRIEF DESCRIPTION OF THE DRAWINGS

Other objects, features and advantages of the invention, its organization, construction and operation will be best understood from the following description taken in conjunction with the accompanying drawings, modifications and alterations of the invention being readily apparent to one skilled in the art without departing from the spirit and scope of the disclosure, and in which.

BRIEF DESCRIPTION OF THE PREFERRED EMBODIMENT

Figure 1:
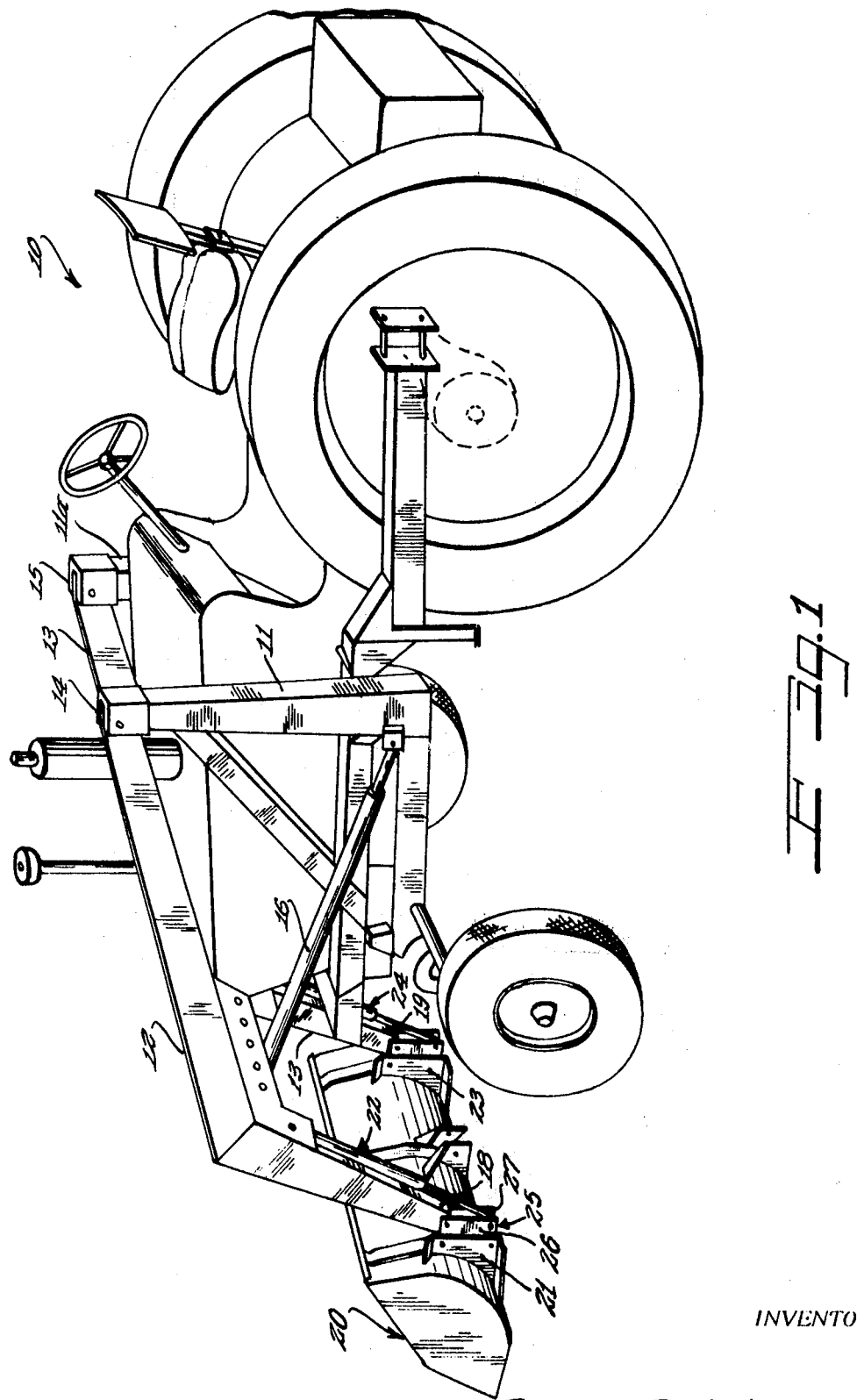
FIG. 1 is an elevational view of a loader mounted on a tractor wherein the implement is attached according to the invention.

In the drawings, there is generally shown at 10 a tractor mounted loader including an upstanding frame portion 11 and 11a secured to the tractor in a quick-connect-disconnect relationship as disclosed in U.S. patent application Ser. No. 814,595 of Eidy et al., assigned to the same assignee as the present invention, and carrying a pair of spaced-apart boom members 12 and 13 which are respectively pivotally connected to the upstanding members 11 and 11a at their upper ends 14 and 15. A corresponding pair of hydraulic rams 16 and 17 are operatively connected between intermediate portions of the booms 12 and 13 and the lower ends of upstanding members 11 and 11a and serve to raise and lower the boom members 12 and 13 by pivoting these members about their pivot points at 14 and 15.

Boom members 12 and 13 include forward end portions 18 and 19, respectively, to which a work implement 20 is releasably attached. The work implement 20 carries a first coupling plate 21 and a second coupling plate 23 in a spaced-apart relationship corresponding to the spacing between boom members 12 and 13. Inasmuch at the coupling apparatus at ended portions 18 and 19 of boom members 12 and 13 is substantially identical, attention will be directed to the apparatus associated with the end portion 18.

A coupling section 25 is connected to the end portion 18 of boom 12 and comprises a pair of spaced-apart plates 26 and 27 disposed on either side of the end portion 18. The plates 26 and 27 are secured to end portion 18 by a pin 18a which extends therethrough by way of elongated apertures 26a which provide for an elongate head portion on pin 18a. Plate 26 includes a second elongated aperture therethrough at 26d for receiving a pin 18d to secure the lower portion of plate 26 to the end of a ram 22. The ram 22 has its other end connected to the intermediate portion of boom 12 and is operable to effect the shoveling and dumping actions associated with the loading device. Plate 27 is similarly attached to the end portion 19 of boom 13.

COUPLING

Figure 2:
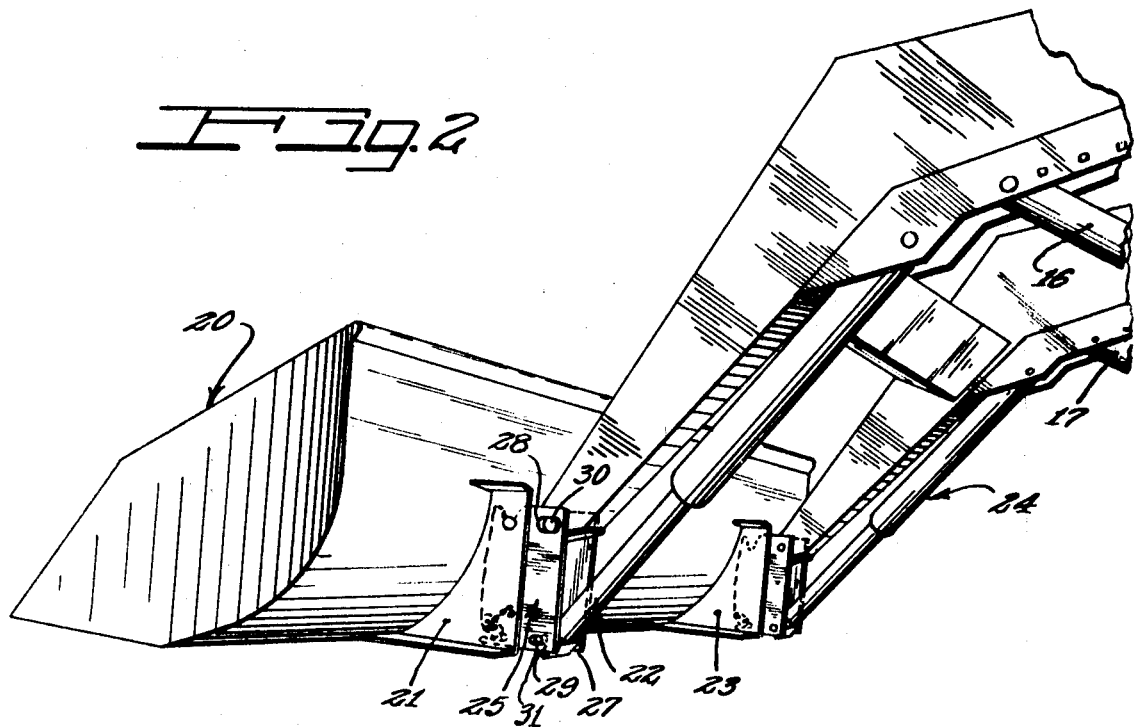
FIG. 2 is an enlarged view of the forward end of the loader, showing the attachment of an implement to the boom in greater detail.
Figure 3:
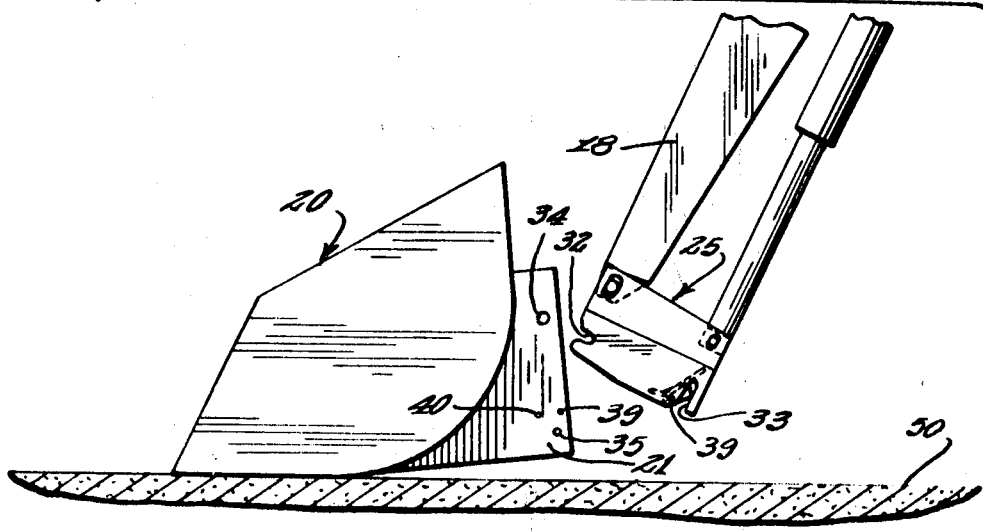
FIG. 3 is a side elevational view of a detached implement and a forward end of a boom as these elements appear just prior to coupling and just after detachment.
Figure 4:
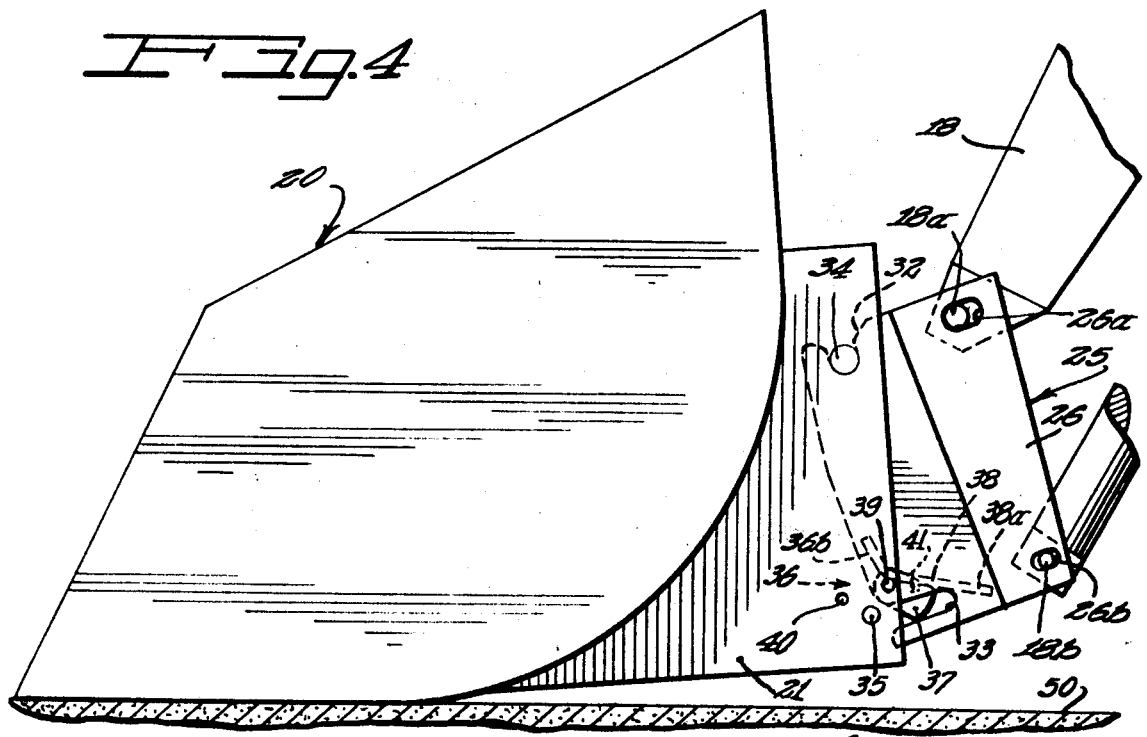
FIG. 4 is a side elevational view illustrating the condition of the implement and the boom during uncoupling and coupling.
Figure 5:
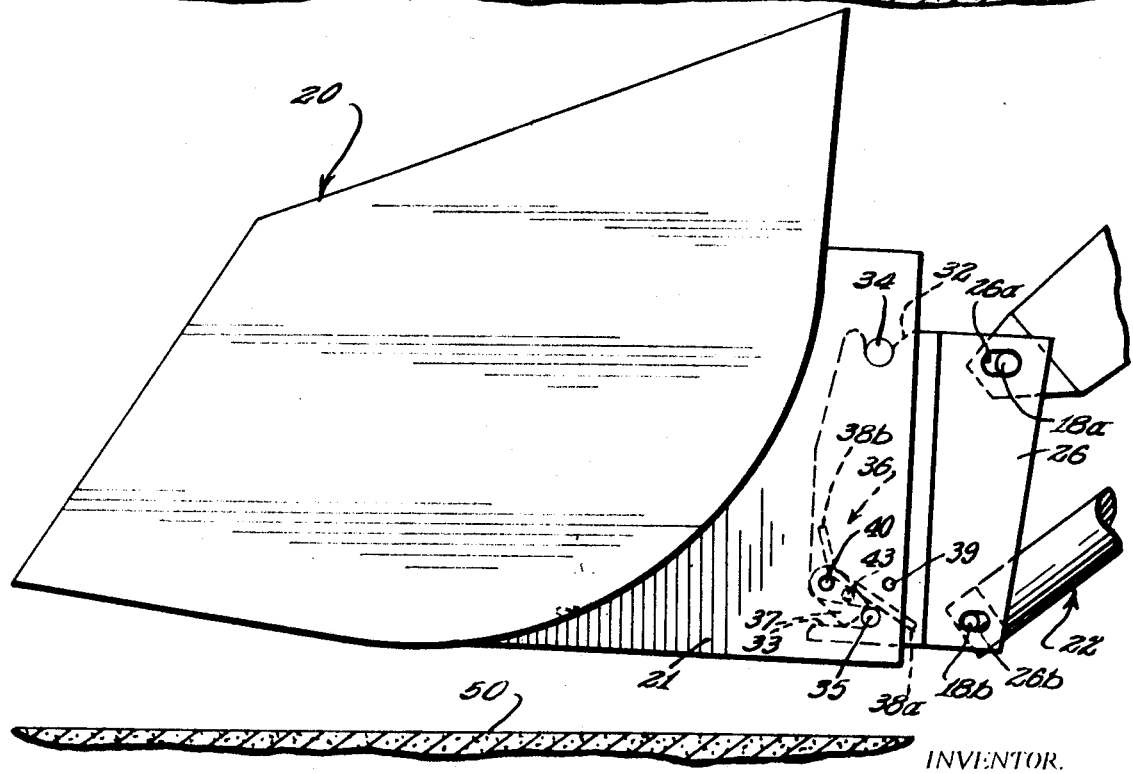
FIG. 5 is a side elevational view illustrating coupling of an implement to a boom and latching and locking of implement to the boom.

Coupling of the work implement 20 to the boom members 12 and 13, as shown in FIGS. 1 and 2, will now be discussed in detail with reference to FIGS. 3, 4 and 5, with FIG. 3 illustrating the approach of the tractor to the implement, FIG. 4 illustrating the initial portion of the coupling contact and FIG. 5 illustrating the latching and locking of the implement to the boom assembly.

As the tractor is driven forward and boom portion 18 approaches the work implement 20, a notch or slot 32 in plate 26 and a corresponding notch or slot in plate 27 are directed to receive a pin 34 which extends perpendicularly to plate 21 of the work implement. Attention is directed that at this time the work implement is resting on a supporting surface 50, usually the ground, and is completely free of any other means of support. It should be noted that a preferred embodiment of the invention provides plates 21 and 23 in pairs on each side of the work implement 20 with the associated pins extending therebetween.

Upon seating of pin 34 in slot 32, as illustrated in FIG. 4, ram 22, and its counterpart ram 24, are extended to pivot plate 26 about pin 18a so that a slot 33 in the lower forward portion of the plate 26 is directed to receive pin 35 which extends perpendicularly to plate 21. Further extension of ram 22 completes the seating of pin 35 in slot 33 as the implement 20 is raised from its supporting surface 50 and the weight of the implement 20 pivots downwardly about pin 34.

A latch assembly 36 is operated to prevent release of pin 35 from slot 33 and uncoupling of the implement whenever it is brought to rest against a supporting surface. The latching mechanism includes a latch plate 37 which is pivotally mounted to plate 21 by pin 39. The latch plate 37 is pivoted out of the path of pin 35 by the pin 35 as it travels toward the rear end of slot 33. After latching, forward travel of the pin 35 is restricted by latch plate 37. The latch plate 37 has connected thereto a release member 38 including a first portion 38a which rests against pin 35 in the latched condition and prevents latch plate 37 from swinging too far forward and a portion 38b, either of which portions may be utilized for releasing the latch during the uncoupling operation.

The plate 21 includes an aperture 40 and the plate 26 includes an aperture 41 and a latch plate 37 includes an aperture aligned with aperture 41, all of which align to receive a lock pin 43 to be inserted after the implement has been fully coupled to the boom assembly.

UNCOUPLING

The first step in uncoupling the work implement from the boom assembly would be to remove pin 43 to permit operation of the latch assembly 36.

The work implement 20 is then lowered to a supporting surface so that, with latch mechanism 36 released, pin 35 is pivoted outwardly through slot 33 about the pivot point provided by pin 34. The apparatus is now in a condition as illustrated in FIG. 4. This movement is, of course, accomplished by retracting rams 22 and 24 slightly so that the weight of the implement 20 is pivoted upwardly about pin 34.

When the pins 35 are free from slots 33 rams 16 and 17 are slightly retracted to lower end portions 18 and 19 of boom members 12 and 13 which will withdraw pin 34 from slots 32. The apparatus is now in the condition illustrated in FIG. 3 and the tractor may be backed away from the work implement and the work implement and tractor are free of each other. The coupling device 25 remains with the loader and is designed to be used with a variety of loader detachments, such as scopes, stackers, manure forks, dozer blades, etc.

There has been described coupling apparatus for use with tractor loaders, a portion of which coupling apparatus remains with loader and is employed to couple a variety of work implements therewith which have cooperatively designed attachment portions. Therefore, it is no longer necessary to maintain the work implement attached to the loader and require a separate loader assembly for each job required of loaders. Also, an operation is not required to painstakingly align a work implement and a loader during coupling and uncoupling to prevent binding of the coupling apparatus.

What I claim is:

1. In a loading apparatus of the type including a movably mounted boom having a free end to which a work implement is detachably secured, the improvement comprising coupling means for quickly coupling and uncoupling the work implement and the boom, said coupling means comprising:

a first pin secured to and extending from the work implement;

an upwardly opening notch means on the boom for receiving said pin to form a pivotal connection for use in coupling and uncoupling the work implement and the boom;

a second pin secured to the work implement below said first pin;

means forming a generally horizontally extending slot located below the notch means on the boom for receiving said second pin when the notch and pin are engaged and the work implement is pivoted about the pivotal connection toward the boom; and latching means for releasably retaining said second pin in said slot comprising:

a latch plate mounted at the front of said slot for pivotal movement about a generally horizontal axis disposed above said slot, said latch plate being gravitationally biased to an interference relationship with respect to travel of said second pin and pivoted rearwardly and upwardly out of the interference relationship as said pin travels inwardly of said slot and said latch plate gravitationally pivoting downwardly into a blocking position when said second pin is fully seated in said slot, and lever means on said latching plate engaging said second pin when in the fully seated position to prevent pivotal movement of said latch plate outwardly of said slot, thereby to wedge said second pin in said slot for securely coupling the work implement to the boom.

References Cited

UNITED STATES PATENTS

| | | | |
|---|---|---|---|
| 2,447,150 | 8/1948 | Andersen | 214—145 |
| 3,181,892 | 5/1965 | Hollyday | 172—272X |
| 3,204,793 | 9/1965 | Lane | 214—145X |
| 3,237,795 | 3/1966 | Kromer | 214—145X |
| 3,243,066 | 3/1966 | Gardner et al. | 214—145X |
| 3,389,819 | 6/1968 | Schumacher | 214—145X |
| 3,512,665 | 5/1970 | Westendorf | 214—145 |

FOREIGN PATENTS

| | | | |
|---|---|---|---|
| 1,164,323 | 2/1964 | Germany | 214—145 |

ALBERT J. MAKAY, Primary Examiner

U.S. Cl. X.R.

172—273